(12) United States Patent
Petersen (10) Patent No.: US 10,291,117 B2
(45) Date of Patent: May 14, 2019

(54) SWITCHED POWER CONVERTER WITH CONFIGURABLE PARALLEL/SERIAL INDUCTOR ARRANGEMENT

(71) Applicant: Dialog Semiconductor (UK) Limited, London (GB)

(72) Inventor: Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/099,871

(22) Filed: Apr. 15, 2016

(65) Prior Publication Data

US 2017/0126146 A1     May 4, 2017

(30) Foreign Application Priority Data

Oct. 28, 2015   (DE) .................. 10 2015 221 098

(51) Int. Cl.
*H02M 3/156*   (2006.01)
*H02M 3/158*   (2006.01)
*H02M 1/14*    (2006.01)

(52) U.S. Cl.
CPC .......... *H02M 3/156* (2013.01); *H02M 3/158* (2013.01); *H02M 3/1584* (2013.01); *H02M 1/14* (2013.01)

(58) Field of Classification Search
CPC ............ G05F 1/563; G05F 1/61; G05F 1/614; H02M 2001/0045; H02M 2001/007;
(Continued)

(56) References Cited

U.S. PATENT DOCUMENTS 5,617,015 A    4/1997 Goder et al.
6,188,209 B1   2/2001 Poon et al.
(Continued)

FOREIGN PATENT DOCUMENTS

DE      4124616     1/1993
DE   102013007056  10/2014

OTHER PUBLICATIONS

"Multi-Phase, 2-Kilowatt, High-Voltage, Regulated Power Supply," by D.R. Garth et al., PCSC '71; Power Conditioning Specialists Conference, California Institute of Technology; Apr. 19-20, 1971; Pasadena, CA, pp. 110-116.

(Continued)

*Primary Examiner* — Nguyen Tran
(74) *Attorney, Agent, or Firm* — Saile Ackerman LLC; Stephen B. Ackerman (57) ABSTRACT

A multi-phase power converter is described, which is configured to convert power between an input port and an output port. The multi-phase power converter comprises a basic switched converter comprising a basic inductor, wherein the basic switched converter is configured to convert power between the input port and the output port. Furthermore, the multi-phase power converter comprises an auxiliary switched converter comprising an auxiliary inductor, wherein the auxiliary switched converter is configured to convert power between the input port and an auxiliary port. In addition, the multi-phase power converter comprises a set of configuration switches configured to couple the auxiliary port to the output port, or to arrange the auxiliary inductor and the basic inductor in series.

27 Claims, 6 Drawing Sheets

(58) Field of Classification Search
CPC .............. H02M 3/158; H02M 3/1582; H02M 2001/0067; H02M 3/1584; H02M 3/156; H02M 2003/1566; H02M 3/155; H02M 3/1563; H02M 2001/0009
USPC .......................... 323/266, 271–272, 282–285
See application file for complete search history.

(56) References Cited

U.S. PATENT DOCUMENTS

| | | | |
|---|---|---|---|
| 7,301,317 | B1 | 11/2007 | Mattingly |
| 7,969,129 | B2* | 6/2011 | Kudo .................. H02M 3/1584 323/266 |
| 8,063,619 | B2* | 11/2011 | Zhu ........................... H02J 7/32 323/266 |
| 8,228,050 | B2* | 7/2012 | Sato ...................... H02M 3/158 323/271 |
| 2005/0264271 | A1 | 12/2005 | Lam et al. |
| 2010/0231186 | A1 | 9/2010 | Chen et al. |
| 2012/0105040 | A1 | 5/2012 | Leipold et al. |
| 2014/0246908 | A1 | 9/2014 | Chew et al. |
| 2014/0347900 | A1 | 11/2014 | Ura |
| 2015/0097542 | A1 | 4/2015 | Repton et al. |
| 2017/0085176 | A1* | 3/2017 | Mathe .................. H02M 3/158 |

OTHER PUBLICATIONS

"Single-Inductor Multi-Output (SIMO) DC-DC Converters With High Light-Load Efficiency and Minimized Cross-Regulation for Portable Devices," by Ming-Hsin Huang et al., IEEE Journal of Solid-State Circuits, vol. 44, No. 4, Apr. 2009, pp. 1099-1111.

"Interleaved Buck Converter with Variable Number of Active Phases and a Predictive Current Sharing Scheme," by L. T. Jakobsen et al., 2008 IEEE Power Electronics Specialists Conference, Jun. 15-19, 2008, pp. 3360-3365.

"Load-Balance-Independent High Efficiency Single-Inductor Multiple-Output (SIMO) DC-DC Converters," by Younghun Ko et al., Journal of Semiconductor Technology and Science, vol. 14, No. 3, Jun. 2014, pp. 300-312.

"Single-Inductor Multiple-Output Switching Converters With Time-Multiplexing Control in Discontinuous Conduction Mode," by Dongsheng Ma et al., IEEE Journal of Solid-State Circuits, vol. 38, No. 1, Jan. 2003, pp. 89-100.

"Improved Phase Shedding Techniques in Interleaved Converters," by Anagha Rayachoti, Missouri S&T, Scholars' Mine, Masters Theses, Copyright 2013, Department of Electrical and Computer Engineering, Missouri University of Science and Technology, Rolla, MO 65409, pp. 1-6.

"Multiphase dc-dc converter with high dynamic performance and high efficiency," by W. Y. Wang et al., IET Power Electronics, vol. 4, Issue 1, Jan. 2011, pp. 101-110.

"Efficiency improvement in multiphase converter by changing dynamically the Number of phases," by P. Zumel et al., Power Electronics Specialists Conference, 2006. PESC '06. 37th IEEE, Jun. 18-22, 2006, pp. 1-6.

German Office Action, File No. 10 2015 221 098.7, dated May 6, 2016, Applicant: Dialog Semiconductor (UK) Limited, 5 pgs, and English Language Translation, 5 pgs.

German Office Action, File No. 10 2015 221 098.7, dated Oct. 24, 2018, Applicant: Dialog Semiconductor (UK) Limited, 5 pgs. and English Language Translation, 6 pgs.

* cited by examiner

501
Determining an output power to be provided at the output port

↓

502
Coupling the auxiliary port (directly) to the output port, if the output power is greater than a power threshold

↓

503
Arranging the auxiliary inductor and the basic inductor in series, if the output power is lower than the power threshold

SWITCHED POWER CONVERTER WITH CONFIGURABLE PARALLEL/SERIAL INDUCTOR ARRANGEMENT

TECHNICAL FIELD

The present document relates to power converters with regulated output voltage or output current. In particular, the present document relates to switched power converters with increased efficiency.

BACKGROUND

The efficiency of a conventional switched power converter, such as a buck converter, is dominated by the losses within the switches (e.g. field effect transistors, FETs) and the inductor of the power converter. If the power converter provides a relatively high output voltage $V_{out}$, the power converter typically exhibits a reduced conversion efficiency, because the switches must be implemented in high voltage technology, and thus the switches have an increased switch area and increased reverse recovery losses. Relatively large FETs typically cause relatively high switching losses, because of an increased gate charge and LX capacitance.

The voltage which is applied to the inductor of a buck converter is proportional to the difference between the input voltage $V_{in}$ and the output voltage $V_{out}$, i.e. $V_{in}-V_{out}$, during the magnetization phase, or proportional to $V_{out}$ during the demagnetization phase. Increased inductor voltages cause increased current variations dI/dt and thus an increased switching frequency (for achieving a pre-determined current ripple) and/or an increased current ripple (for a given switching frequency). In both cases this leads to increased inductor core losses and to an increased dissipation power.

Maintaining low current variations $dI_L/dt$ at increased input and output voltages typically requires inductors (i.e. coils) with increased inductance L, due to the relation $dI_L/dt=V_L/L$. However, coils with an increased inductance L have an increased number of turns. For inductors to maintain their Direct Current Resistance (DCR) even with an increased number of turns, each turn has to make use of a wire with an increased thickness to compensate for the impedance increase. Thus the size of the inductor is growing twice with an increased inductance L (due to the increased number of turns and due to the increased wire thickness). On the other hand, if the inductor dimensions are not increased, an increased inductance L leads to the effect that the DCR of the inductor is growing twice due to the additional number of turns and due to the use of a thinner wire.

Over the last years, battery powered applications such as smartphones and tablets increased their computing power, screen resolution and display frame rate and added connected standby modes. This triggered changes in the requirements for the power management of such battery powered applications.

The increased computing power triggered a growth in maximum current requirements. The trend towards higher peak currents was accelerated by the ongoing shrink of technology nodes. Processor cores may now exhibit millions of transistors on a single chip. But the smaller geometries increase leakage currents from each transistor with the result that modern multi-core processors implement leakage current in the range of Amperes.

Typical processors of early smartphones were continuously in active mode, whenever the smartphone was in use, scaling the provided computing power by changing the processor's clock rate (and supply voltage) depending on the MIPS demand (pulling an average current in the range of 1-2 A). On the other hand, todays processor cores are either running at maximum speed or are disconnected from a power rail to reduce the leakage current of a processor core to a minimum duty cycle. The provision of the required MIPS within short duty cycles leads to a substantial increase of the processor's peak current consumption (by a factor of more than 10), while the battery capacity and the thermal handling capability of such portable applications have increased at a slower rate. As a result of this, the provision of peak currents is typically limited to relatively short periods and by that has limited impact on the average current consumption of the battery powered application.

In multi-core topologies only a subset of available cores are enabled in order to provide sufficient processing power to handle a required computing load. Furthermore, "Big-Little" architectures may be provided, which use smaller processor cores during normal usage, and which flip transparently to more powerful cores when detecting a user command, during screen update or after application wake-up.

The total heat-up and thermal limit of a battery powered application is typically dominated by dissipation power of the IC consuming the peak power (80-90%), so that in most cases the efficiency of the power supply of a battery powered application is less important during peak current events.

The introduction of so called "Connected Standby Modes" disabled the complete shutdown of a battery powered application. Smartphones or Tablets are nowadays continuously processing Email, Social Network Data, News Feeds, GPS and other sensor output in the background. This is implemented in dedicated low power modes, so that the drain of the battery is minimized. In these modes the dissipation power of the power supply typically has a substantial impact on the mobility time of a battery powered application. As such, there is a need for increasing the efficiency of power converters at light loads.

Where in former times a battery powered application was either in use or put to a deep standby mode (with only the wireless modem periodically waking up to check the network connection) todays battery powered applications are most of the time in a light load mode (pulling a few mA), but can also pull significant short term peak currents up to 20 A to implement short application response times by enabling maximum computing power for limited periods of time.

SUMMARY

The present document addresses the technical problem of providing an efficient and a compact power converter, which is configured to supply load currents within a large current range (of several orders of magnitude). According to an aspect, a multi-phase power converter is described, which is configured to convert power between an input port and an output port. The multi-phase power converter comprises a basic switched converter comprising a basic inductor (or basic coil). The basic switched converter (also referred to herein as a basic phase) is configured to convert power between the input port and the output port.

Furthermore, the multi-phase power converter comprises an auxiliary switched converter comprising an auxiliary inductor (or auxiliary coil). The auxiliary switched converter (also referred to herein as an auxiliary phase) is configured to convert power between the input port and an auxiliary port.

In addition, the multi-phase power converter comprises a set of configuration switches which is configured to couple the auxiliary port (directly) to the output port, or to couple the auxiliary inductor (directly) in series with the basic inductor. In particular, the set of configuration switches may be configured to couple the auxiliary port to the output port or to arrange the auxiliary inductor in series with basic inductor in a mutually exclusive manner. When coupling the auxiliary inductor (directly) in series with the basic inductor, the coupling is preferably performed such that as a result of the coupling a joint switched converter is obtained, which has the same type as the basic switched converter and/or the auxiliary switched converter (e.g. buck-type, boost-type, buck-boost-type or inverter-type), but which exhibits a joint inductor which corresponds to the serial arrangement of the basic inductor and of the auxiliary inductor.

The set of configuration switches may comprise a first configuration switch for coupling the auxiliary port (directly) to the output port. Furthermore, the set of configuration switches may comprise a second configuration switch for coupling the auxiliary inductor (directly) to the basic inductor. The second configuration switch may be maintained open, when the first configuration switch is closed (and vice versa). Furthermore, the first and the second configuration switch may both be maintained open, thereby decoupling the auxiliary switched converter from the output of the multi-phase power converter and thereby operating the multi-phase power converter without the auxiliary switched converter (and possibly with the basic switched power converter only).

As such, the multi-phase power converter may be configured to arrange the basic switched converter and the auxiliary switched converter in parallel or to arrange the basic inductor and the auxiliary inductor in series, depending on the power requirements at the output port. By doing this, a compact power converter may be provided which is configured to operate efficiently at relatively high loads (by arranging switched converters in parallel) and at relatively low loads (by arranging the inductors in series). Furthermore, the multi-phase power converter may be operated without the auxiliary switched converter (i.e. without the auxiliary phase) at mid loads which lie between relatively low loads and relatively high loads. In particular, only the basis inductor (and only the basic switched converter) may be used in such situations.

The multi-phase power converter may comprise a controller (e.g. a microprocessor and/or an analog circuit) which is configured to determine whether the output power which is to be provided at the output port is above or below a power threshold. Furthermore, the controller may be configured to control the set of configuration switches to couple the auxiliary port (directly) to the output port, if it is determined that the output power is above the power threshold. In particular, the controller may be configured to operate the basic switched converter and the auxiliary switched converter in parallel between the input port and the output port, if the auxiliary port is coupled to the output port. By doing this, the basic switched converter and the auxiliary switched converter may be arranged in parallel between the input port and the output port, for providing relatively high power at the output port.

Furthermore, the controller may be configured to control the set of configuration switches to couple the auxiliary inductor in series with the basic inductor, if it is determined that the output power is below the power threshold. By doing this, the effective inductance of the basic switched converter or of the auxiliary switched converter (i.e. of a joint switched converter) may be increased, thereby reducing ripple and/or increasing efficiency of the multi-phase power converter when providing relatively low power at the output port.

In addition, a mid power threshold may be provided, wherein the mid power threshold is lower than the power threshold. The controller may be configured to control the set of configuration switches to decouple the auxiliary switched converter from the output port (and/or to deactivate the auxiliary switched converter), if it is determined that the output power is below the power threshold and above the mid power threshold. Furthermore, the controller may be configured to control the set of configuration switches to arrange the auxiliary inductor in series with the basic inductor, if it is determined that the output power is below the mid power threshold. As such, the configuration of the multi-phase power converter may be adapted in a precise and energy-efficient manner to the requested output power.

The basic switched converter typically comprises a basic switching cell and the auxiliary switched converter typically comprises an auxiliary switching cell. A switching cell of a switched converter may comprise a high side switch and a low side switch which are arranged in series (e.g. MOS switches). An inductor of a switched converter may be coupled to a midpoint between the high side switch and the low side switch. The controller may be configured to deactivate one of the basic switching cell and the auxiliary switching cell (e.g. by opening the high side switch and the low side switch) and operate the other one of the basic switching cell and the auxiliary switching cell (e.g. by commutating the high side switch and the low side switch in an alternating manner at a certain switching frequency), if the auxiliary inductor is arranged in series with the basic inductor. As such, the controller may create an effective, i.e. joined, switched converter with one of the two switching cells and with the serial arrangement of the basic inductor and the auxiliary inductor, thereby providing an effective or joined switched converter with increased inductance for relatively low loads at the output port.

The basic switching cell and the auxiliary switching cell may be arranged in parallel to the input port. In particular, the basic switching cell and the auxiliary switching cell may comprise a high side switch and a low side switch, respectively, which are arranged between a high side and a low side (e.g. ground) of the input port. Furthermore, the basic inductor may be arranged to couple a midpoint between the basic high side switch and the basic low side switch to a high side of the output port. In a similar manner, the auxiliary inductor may be arranged to couple a midpoint between the auxiliary high side switch and the auxiliary low side switch to a high side of the output port. A low side of the output port may be coupled to the low side of the input port. As such, the basic switched converter and the auxiliary switched converter may comprise a buck-type converter, thereby providing a step-down multi-phase power converter. In case of such a buck-type switched converter, the set of configuration switches may be configured to couple the auxiliary inductor (directly) to the output port or to couple the auxiliary inductor (directly) to the basic inductor.

Alternatively, the basic switching cell and the auxiliary switching cell may be arranged in parallel to the output port. In particular, the basic switching cell and the auxiliary switching cell may comprise a high side switch and a low side switch, respectively, which are arranged between a high side and a low side (e.g. ground) of the output port. Furthermore, the basic inductor may be arranged to couple a midpoint between the basic high side switch and the basic low side switch to a high side of the input port. In a similar manner, the auxiliary inductor may be arranged to couple a midpoint between the auxiliary high side switch and the auxiliary low side switch to a high side of the input port. A low side of the input port may be coupled to the low side of the output port. As such, the basic switched converter and the auxiliary switched converter may comprise a boost-type converter, thereby providing a step-up multi-phase power converter. In case of such a boost-type switched converter, the set of configuration switches may be configured to couple the auxiliary inductor (directly) to the input port or to couple the auxiliary inductor (directly) to the basic inductor.

Alternatively, the basic switching cell and the auxiliary switching cell may be arranged between (the high side of) the input port and (the high side of) the output port. In particular, the basic switching cell and the auxiliary switching cell may comprise an input switch and an output switch, respectively, which are arranged between a high side of the input port and a high side of the output port. Furthermore, the basic inductor may be arranged to couple a midpoint between the basic input switch and the basic output switch to a low side of the input port and of the output port (which are typically directly coupled to one another). In a similar manner, the auxiliary inductor may be arranged to couple a midpoint between the auxiliary input switch and the auxiliary output switch to the low side of the input port and of the output port. As such, the basic switched converter and the auxiliary switched converter may comprise inverters, thereby providing an inverting multi-phase power converter). In case of such an inverter-type switched converter, the set of configuration switches may be configured to couple the auxiliary inductor to ground or to couple the auxiliary inductor directly to the basic inductor.

Alternatively, the basic switched converter may comprise a first basic switching cell and the auxiliary switched converter may comprise a first auxiliary switching cell, which are arranged in parallel to the input port (between the high side and the low side of the input port). Furthermore, the basic switched converter may comprise a second basic switching cell and the auxiliary switched converter may comprise a second auxiliary switching cell, which are arranged in parallel to the output port (between the high side and the low side of the output port). Furthermore, the basic inductor may be arranged to couple a midpoint of the first basic switching cell to a midpoint of the second basic switching cell. In a similar manner, the auxiliary inductor may be arranged to couple a midpoint of the first auxiliary switching cell to a midpoint of the second auxiliary switching cell. As such, the basic switched converter and the auxiliary switched converter may comprise buck-boost-type converters, thereby providing a buck-boost multi-phase power converter. In case of such a buck-boost-type switched converter, the set of configuration switches may be configured to couple the auxiliary inductor to the mid points of the auxiliary switching cells of the auxiliary switched converter or to couple the auxiliary inductor directly to the basic inductor.

The controller may be configured to control the basic switched converter and/or the auxiliary switched converter such that an output voltage at the output port is regulated to a target voltage.

The multi-phase power converter may further comprise a second basic switched converter with a second basic inductor. The second basic switched converter is configured to convert power between the input port and a second output port. As such, the multi-phase power converter may be configured to provide power at two separate output ports using two separate basic switched converters.

The set of configuration switches may be configured to couple the auxiliary port (directly) to the output port or (directly) to the second output port (in a mutually exclusive manner). Furthermore, the set of configuration switches may be configured to arrange the auxiliary inductor (directly) in series with the basic inductor or (directly) in series with the second basic inductor. As such, the auxiliary switched converter may be used to supply power to the (first) output port or to the second output port. Furthermore, the auxiliary inductor may be used to increase the effective inductance in conjunction with the (first) basic inductor or in conjunction with the second basic inductor. This may be achieved for buck-type switched converters, for boost-type switched converters, for buck-boost-type switched converters and/or for inverter-type switched converters using an appropriate set of configuration switches.

Alternatively or in addition, the multi-phase power converter may comprise a second auxiliary switched converter with a second auxiliary inductor, wherein the second auxiliary switched converter is configured to convert power between the input port and a second auxiliary port. The set of configuration switches may be configured to (directly) couple the second auxiliary port to the output port (for relatively high load conditions at the output port). Furthermore, the set of configuration switches may be configured to (directly) couple the second auxiliary inductor in series with the basic inductor (for increasing the effective inductance during relatively low load conditions at the output port).

In case of a second basic switched converter the second auxiliary phase may also be combined with the second basic switched converter in an analogous manner (in a parallel arrangement of the switched converters or in a serial arrangement of the inductors).

This may be achieved using an appropriate set of configuration switches, when using a buck-type switched converter, a boost-type switched converter, a buck-boost-type switched converter and/or an inverter-type switched converter as a second auxiliary switched converter.

Furthermore, the set of configuration switches may be configured to (directly) couple the second auxiliary inductor in series with the auxiliary inductor. In particular, a serial arrangement of the second auxiliary inductor, the (first) auxiliary inductor and the basic inductor may be created for further increasing the effective inductance at low load conditions. This may apply in an analogous manner to a second switched converter.

The basic switched converter and the auxiliary switched converter may each comprise one or more of: a buck converter, a boost converter, an inverter and/or a buck-boost converter. An appropriate set of configuration switches may be provided to allow for a change between a parallel and a serial arrangement of the inductors, when using the different types of switched converters.

The basic switched converter and the auxiliary switched converter may be operated in an interleaved manner, if the auxiliary port is coupled to the output port, thereby reducing current and voltage ripple.

The multi-phase power converter may comprise an input capacitor arranged in parallel to the input port, and/or an output capacitor arranged in parallel to the output port, for reducing current and voltage ripple.

Overall, it should be noted that a multi-phase power converter may comprise 1, 2 3 or more basic switched converters (for different output voltages/output ports) and/or 1, 2, 3 or more auxiliary switched converters. The auxiliary switched converters may be arranged in parallel to any one of the basic switched converters. Furthermore, the auxiliary inductors of the auxiliary switched converters may be arranged in series with any one of the basic inductors of the basic switched converters.

According to a further aspect, a method for converting power between an input port and an output port of a power converter is described. The power converter comprises a basic switched converter comprising a basic inductor, wherein the basic switched converter is configured to convert power between the input port and the output port. The power converter further comprises an auxiliary switched converter comprising an auxiliary inductor, wherein the auxiliary switched converter is configured to convert power between the input port and an auxiliary port.

The method comprises determining an output power to be provided at the output port; coupling the auxiliary port to the output port, if the output power is greater than a power threshold; and coupling the auxiliary inductor in series with the basic inductor, if the output power is lower than the power threshold.

Furthermore, a mid power threshold may be considered to adapt the power consumption in a smooth manner to the requested output power, wherein the mid power threshold is smaller than the power threshold. The auxiliary port may be coupled to the output port, if the output power is greater than the power threshold; the auxiliary port may be decoupled (completely) from the output port (and from the basic inductor), if the output power is smaller than the power threshold and greater than the mid power threshold. Furthermore, the auxiliary inductor may be coupled in series to the basic inductor, if the output power is lower than the mid power threshold.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

As outlined above, the present document is directed at providing a compact power converter which operates efficiently across a large range of load currents.

A possible approach to providing power converters for relatively large ranges of load currents is the use of multi-phase power converters. A multi-phase power converter is an arrangement of switched power converters having outputs which are connected in parallel. Multi-phase converters may switch their phases in an interleaved manner, thereby implementing input and output current ripple cancellation to allow reduced input and output capacitances.

To increase efficiency all phases of a multi-phase converter may only be enabled at time instants when maximum output current is requested. Individual phases may be dynamically disabled at reduced loads via processor instructions (port level, command interface) or by the controller of the multi-phase converter which is autonomously supervising the total output current. This phase shedding helps to maintain high conversion efficiency over an increased output current range because, when reaching a relatively low current within an enabled phase of the power converter, the converter dissipation power is dominated by the switching losses of the enabled phases.

Modern processor IC packages may implement multiple supply rails which are connected individually to a subset of different processor cores of the processor, therefore requiring a multi-rail power management topology. The thermal handling capability of the IC package and the battery powered application may be lower than the sum of the maximum power which is drained by each processor supply rail individually. This means that only a subset of processor cores can run at maximum power (e.g. the CPU, i.e. the Central Processing Unit) at a certain time instant, wherein other processor cores (e.g. the GPU, i.e. the Graphical Processing Unit) are either off or run at reduced performance. Alternatively all processor cores (e.g. CPU and GPU) may pull medium current that is below their maximum input current per rail.

By disabling the phases in a multi-phase converter, ripple cancellation is progressively reduced, thereby triggering higher input and output voltage ripple. For a certain combination of input to output voltage and a given inductance, low current ripple can typically only be maintained during phase shedding by increasing the switching frequency of a phase. This, however, causes higher switching losses and reduces the efficiency gain obtained from the shedding of phases.

In the following multi-phase voltage step-down (buck) converters are described, which are configured to maintain high efficiently even at relatively low load currents. It should be noted that the architectures which are described apply in a similar way to multi-phase step-up (boost), buck-boost and/or inverting converters. In particular, the described topologies are beneficial for all applications that require DC-DC power conversion with high efficiency at light loads, especially if, because of space constraints, the required maximum output current per rail cannot be provided via a single inductor.

As such, multi-phase switched power converters which increased light load efficiency are described. The increased efficiency may be achieved via reduced inductor current ripple and/or via reduced converter switching frequency. Furthermore, the bill of material (BUM) of the described converters may be reduced, thereby reducing the size of the power converters.

The inductive DC-DC converters which are described in the following comprise multiple inductors, of which at least one allows for a configurable serial connection with a second inductor. The outputs of the phases of a multi-phase converter may be arranged in parallel during the provision of high output currents (to minimize resistive loss) and the inductors of at least some of the phases may be connected in series when shedding phases during light load conditions (to minimize switching loss). As a result of the serial connection of switching inductors during light load current provision, current ripple may be reduced.

Figure 1:
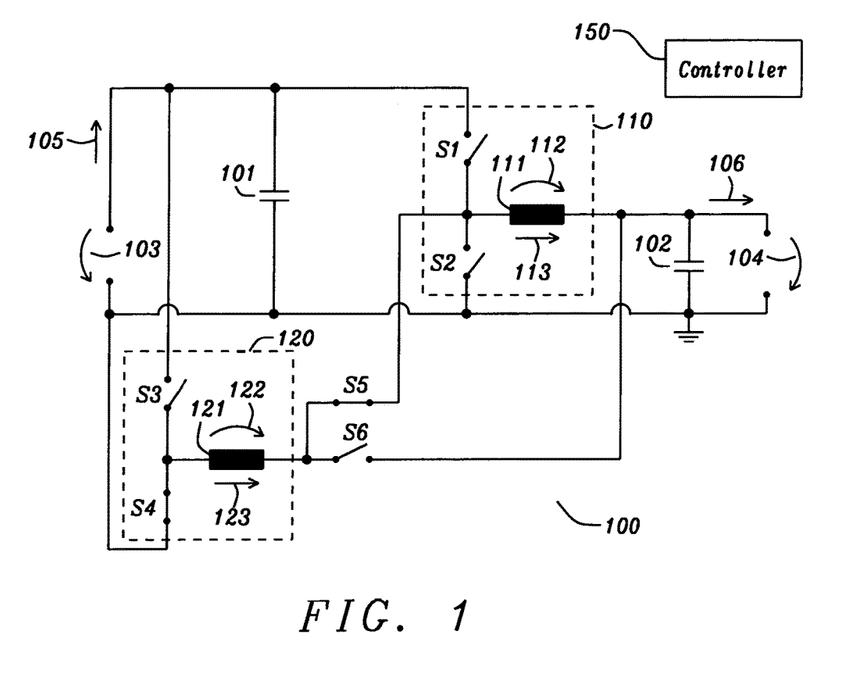
FIG. 1 shows a block diagram of an example multi-phase step-down power converter.

FIG. 1 shows a block diagram of an example multi-phase (DC-DC) power converter 100 having a basic phase 110 and an auxiliary phase 120. Each phase 110, 120 comprises a half bridge or switching cell (with switches S1, S2 and switches S3, S4, respectively) and an inductor 111, 121. Furthermore, the converter 100 comprises an input capacitor 101 which is arranged in parallel to the input (or input port) of the converter 100 (i.e. which is arranged in parallel to the input voltage 103) and an output capacitor 102 which is arranged in parallel to the output (or output port) of the converter 100 (i.e. which is arranged in parallel to the output voltage 104). At the input an input current 105 is drawn (e.g. from a battery) and at the output an output current 106 (or load current) is provided by the converter 100. An inductor 111, 121 of a phase 110, 120 exhibits an inductor voltage 112, 122 and provides an inductor current 113, 123.

The converter 100 comprises configuration switches S5, S6 which are configured to re-arrange the phases 110, 120 and in particular the inductors 111, 121 of the phases 110, 120 in dependence of the load condition of the converter 100. In particular, the configuration switch S6 may be closed (while the switch S5 is open) to arrange the phases 110, 120 in parallel. This arrangement may be used at a relatively high load condition.

On the other hand, the configuration switch S5 may be closed (while the switch S6 is open) to arrange the auxiliary inductor 121 of the auxiliary phase 120 in series with the basic inductor 111 of the basic phase 110. This arrangement may be used at a relatively low load condition. By doing this, the effective inductance of the auxiliary phase 120 may be increased to correspond to the inductance of the serial arrangement of the basic inductor 111 and the auxiliary inductor 121, thereby providing a combined phase which comprises the half bridge S3, S4 and the serial arrangement of inductors 111, 121. The switches S1, S2 may be maintained open.

At mid load conditions both switches S5 AND S6 may be opened in combination with switches S3 and S4, so that current is only provided by the basic switching converter (S1 and S2).

The converter 100 may comprises a controller 150 which is configured to determine the load condition of the converter 100. Furthermore the controller may be configured to control the phase switches S1, S2, S3, S4 and the configuration switches S5, S6 in dependence of the load condition. If a high load condition is detected, the configuration switches S5, S6 may be set to arrange the basic and auxiliary phase 110, 120 in parallel, and the phase switches S1, S2, S3, S4 may be controlled to operate the basic and auxiliary phase 110, 120 to provide power to the output of the converter 100 in parallel. The basic and auxiliary phase 110, 120 are preferably operated in an interleaved manner.

Furthermore, the controller 150 may be configured to set the configuration switches S5, S6 such that the auxiliary inductor 121 and the basic inductor 111 are arranged in series, if a relatively low load condition is detected. Furthermore, the phase switches S1, S2 may be set to remain open and the phase switches S3, S4 may be operated such that the combined phase (i.e. the combined switched converter) S3, S4, 121, 111 provides power to the output of the converter 100.

In other words, at high output current, the controller 150 may close S6 (with S5 being open) and may connect the basic phase 110 in parallel to the auxiliary phase 120. The effective converter inductance is similar to connecting the basic inductor L1 111 in parallel to the auxiliary inductor L2 121, which for L1=L2 results in L1/2, thereby enabling improved transient load performance. In case of an interleaved operation of the phases (180° phase shifted) the current ripple may be cancelled.

If the load reduces to mid load conditions, the auxiliary phase 120 may be disabled e.g. phase switches S3 and S4 and/or S5 and S6 may be maintained opened), thereby maintaining a relatively high conversion efficiency by halving the converter switching losses (while increasing the on-resistance $R_{dson}$ losses, while doubling the current through the remaining basic phase 110 and while increasing input and output voltage ripple). The voltage ripple may be maintained low by doubling the switching frequency, but this would re-increase switching losses.

Alternatively to disabling the auxiliary phase 120 completely, the basic inductor 111 from a disabled basic phase 110 may be arranged in series with the one or more phases 120 that remain active. This serial inductor configuration may e.g. be used for low load conditions, wherein the deactivation of the auxiliary phase 120 may be used for mid load conditions. For L1=L2 this serial connection doubles the effective switching inductance, thereby halving inductor current ripple as well as input and output voltage ripple. If ripple cancellation is not in focus (e.g. because the voltage ripple is limited by relatively large input/output capacitors 101, 102), the serial inductor connection may alternatively enable reduced switching frequency (e.g. reduced by 50%), thereby reducing switching losses.

Figure 2:
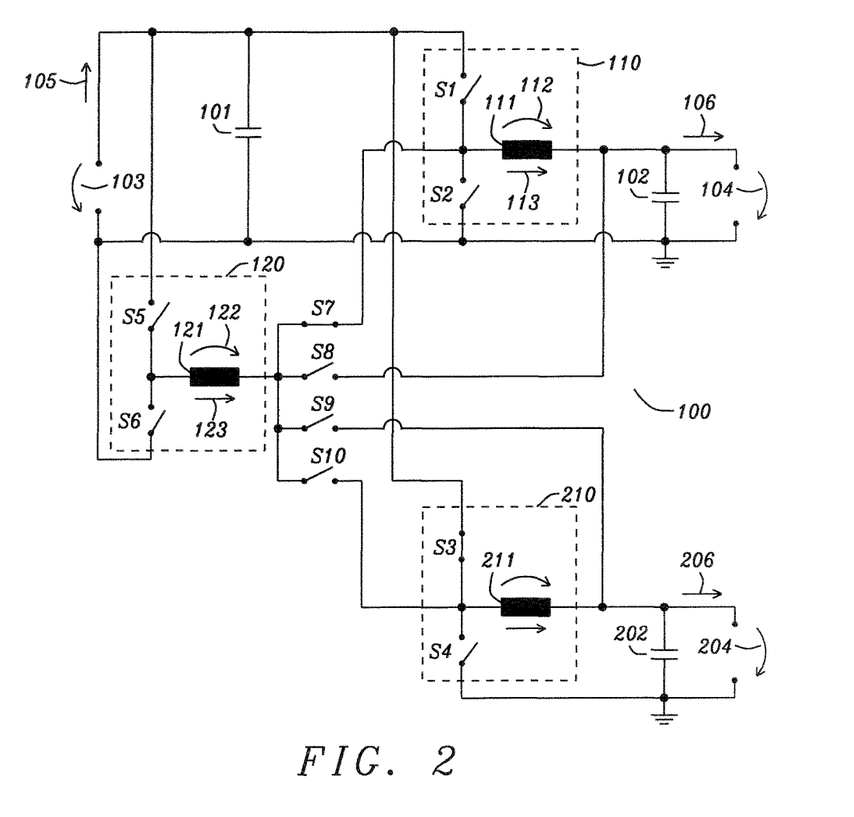
FIG. 2 shows a block diagram of an example multi-phase power converter with multiple output rails.

FIG. 2 shows an example multi-phase power converter 100 with two multi-phase output rails (i.e. two output ports) at output voltages 104, 204, respectively. In particular, the converter 100 comprises two basic phases 110, 210 for two different output voltages 104, 204, respectively. Each basic phase 110, 210 provides an output current 106, 206 to a respective rail/output. In addition, each basic phase 110, 210 typically comprises respective output capacitors 102, 202 which are arranged in parallel to the respective rail/output.

Furthermore, the converter 100 comprises an auxiliary phase 120, which may be rearranged using the configuration switches S7, S8, S9, S10. By closing the switch S8 (while maintaining the other configuration switches S7, S9, S10 open), the auxiliary phase 120 may be arranged in parallel to the first output/the first basic phase 110; by closing the switch S9 (while maintaining the other configuration switches S7, S8, S10 open), the auxiliary phase 120 may be arranged in parallel to the second output/the second basic phase 210; by closing the switch S7 (while maintaining the other configuration switches S8, S9, S10 open), the first basic inductor 111 of the first basic phase 110 may be arranged in series with the auxiliary inductor 121 of the auxiliary phase 120; and/or by closing the switch S10 (while maintaining the other configuration switches S7, S8, S9 open), the second basic inductor 211 of the second basic phase 210 may be arranged in series with the auxiliary inductor 121 of the auxiliary phase 120.

As such, the converter 100 of FIG. 2 is able to provide an increased peak output current and implements increased light load efficiency at two different output rails by either adding current from a basic phase 110, 210 to the auxiliary phase 120 (closing either switch S8 or S9) or by connecting the auxiliary inductor 121 in series with either the first basic inductor 111 or the second basic inductor 210 (by closing S7 or S10).

It should be noted that a reconfiguration of inductors 111, 211, 121 should typically be performed at a time instant when the current through an inductor 111, 211, 121 has ramped down to zero. This does not need to be the case for the basic inductors 111, 211, where inductor current may be temporally cycled by closing S7 and S8 (S9 and S10) in parallel, whenever the auxiliary inductor 121 toggles between a serial and parallel assignment. As such, the configuration switches may be used to short circuit the ends of an inductor 111, 211.

In case both output rails are switching in PFM (pulse-frequency modulation) mode (with diode emulation whenever inductor current crosses zero) with a duty cycle below 50%, the auxiliary inductor 121 may be connected alternatively in series with the first basic inductor 111 and the second basic inductor 211 and by that providing current pulses with reduced ripple to both rails (thereby improving light load efficiency of both rails). This operating mode converts the auxiliary phase 130 into a single-input-multiple-output converter that is combined with additional basic phases 110, 210 to provide a multi-phase multi-rail converter. As such, the controller 150 of the power converter 100 may be configured to couple the auxiliary inductor in series to the first basic inductor 111 or to the second basic inductor 211 in a mutually exclusive and alternating manner.

Figure 3:
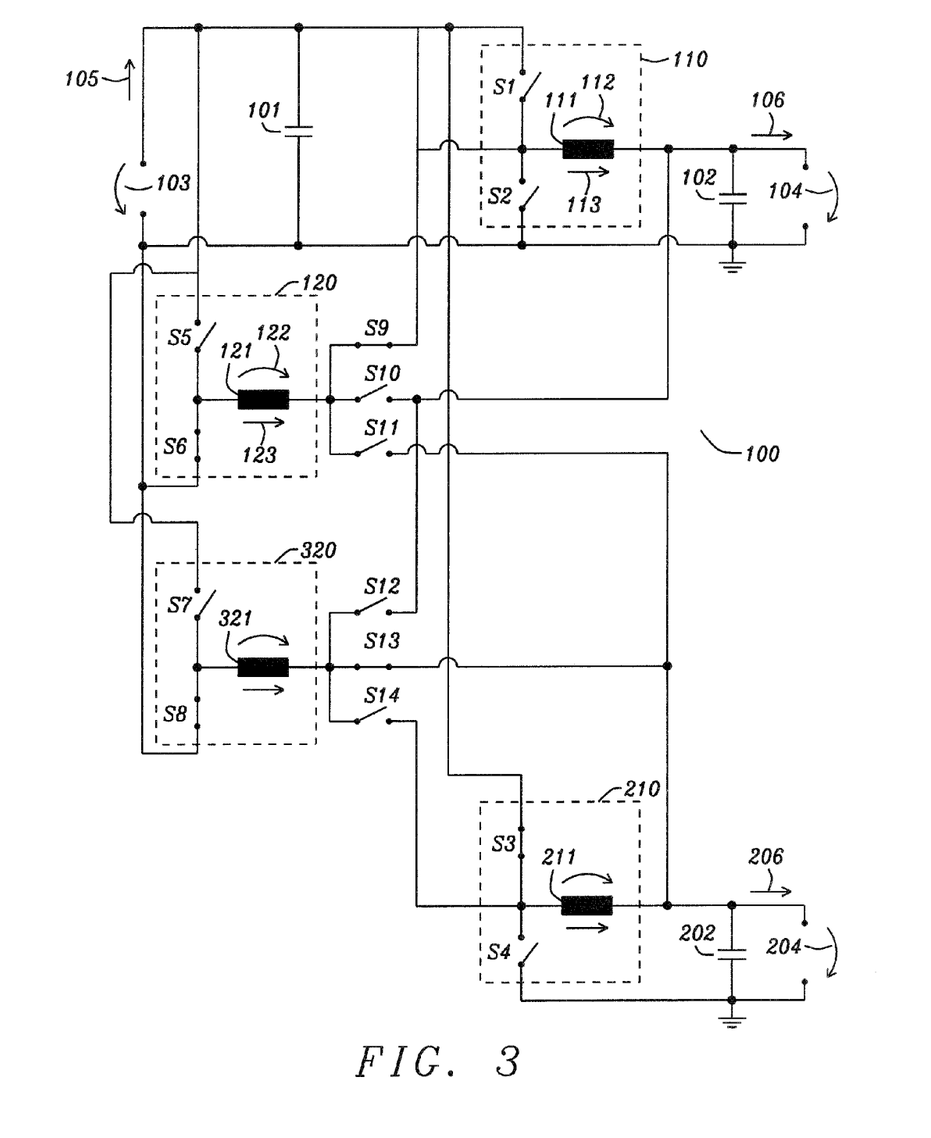
FIG. 3 shows a block diagram of an example multi-phase power converter with multiple auxiliary phases.

FIG. 3 shows an example power converter 100 which is configured to provide a maximum output current for a plurality of outputs/rails from up to three phases which may be arranged in parallel. The converter comprises a first auxiliary phase 120 and a second auxiliary phase 320. Using the configuration switches S9 to S11, the first auxiliary phase 120 may be arranged in parallel to the first output (using S10) or in parallel to the second output (using S11). Furthermore, the first basic inductor 111 may be arranged in series to the first auxiliary inductor 121 (using S9). In a similar manner, using the configuration switches S12 to S14, the second auxiliary phase 320 may be arranged in parallel to the first output (using S12) or in parallel to the second output (using S13). Furthermore, the second basic inductor 211 may be arranged in series to the second auxiliary inductor 321 (using S14). The switches S9-S11 and S12-14 are typically closed in a mutually exclusive manner.

Two fully separated multi-phase converters (for two rails, respectively) would require six switching cells (i.e. half bridges) with six inductors to provide the same maximum output current per rail as the converter 100 of FIG. 3. The converter 100 of FIG. 3 only requires four switching cells and four inductors. In case one of the rails has no light load efficiency requirements, the switches S9 or S14 may not be provided. The same applies to switches S11 or S12 in case one of the output rails requires maximum output currents that can already be delivered with only two phases. As such, the overall BOM of the power converter 100 may be reduced.

It should be noted that the configuration switches S9 to S14 may introduce additional on-resistances losses. However, these on-resistance losses only affect the auxiliary phases 121, 321, wherein the basic phases 111, 211 are not affected. Furthermore, multi-phase configurations are typically only required for high output currents, which are typically enabled for short duty cycle only, so that the on-resistance losses of the configuration switches typically only have a limited impact on the mobility time of battery powered applications.

At low output currents, the converter efficiency is typically dominated by switching losses. When closing the configuration switch S9 (and/or S14) while opening switches S1, S2, S10 and S11 (and/or S3, S4, S12 and S13) two inductors 121, 111 (and/or 321, 211) will be arranged in series so that the effective switching inductance providing current to the first output (and/or the second output) is increased (e.g. doubled). This reduces the current and voltage ripple and/or enables a reduction of the switching frequency of the switching cells. Both changes reduce switching losses (compared to a non-serialized inductor topology), which substantially outweigh the additional DCR of the serial inductors 121, 111 (and/or 321, 211) and the additional on-resistance of the configuration switches S9 (and/or S14).

The converters 100 described herein comprise inductors which may be used at all times, either within a respective phase or in order to increase the inductance of another phase. By doing this, the BOM of the converters 100 may be reduced. Furthermore, high efficiency may be ensured by the use of single inductors, when operating the different phases separately (and directly in parallel to an output of the power converter 100).

The converter 100 described herein typically comprises only a number of phases which is required for providing a total maximum output current. In other words, the number of inductors which are provided within the converter 100 are selected in accordance to the total maximum output current. For providing the total maximum output current, all inductors of the converter 100 are (directly) coupled to one of the outputs of the converter 100. At the same time at least one of the inductors may be used to increase the inductance of at least one phase of the conductor 100, in order to increase efficiency at light load conditions. In other words, the converter 100 only comprises the amount of phases (and inductors), which are required for the total maximum output current, but improves light load efficiency via a different arrangement of the available inductors.

Figure 4:
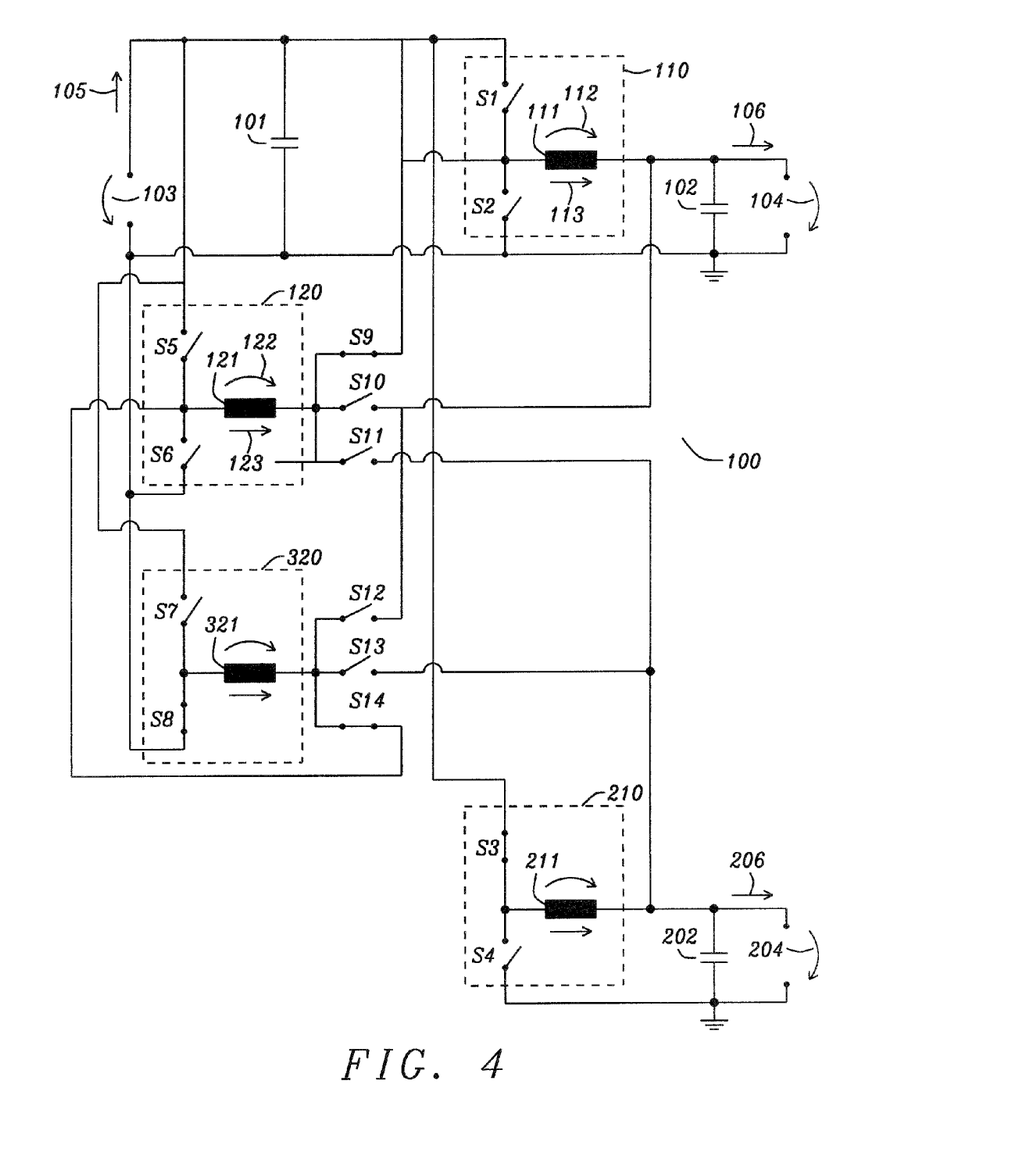
FIG. 4 shows a block diagram of another example multi-phase power converter with multiple auxiliary phases.

FIG. 4 shows an example multi-phase converter 100 which allows for the serialisation of all inductors which are not being used by a phase. In the example of FIG. 4, the second rail may not require high light load efficiency (because e.g. the GPU is either off or pulling high current), so that the second auxiliary inductor 321 may be serialized with the first auxiliary inductor 121 (using S14) and the first basic inductor 111 (using S9) for further reduction of the switching frequency of the converter 100, when providing a low output current to the first rail.

Figure 5:
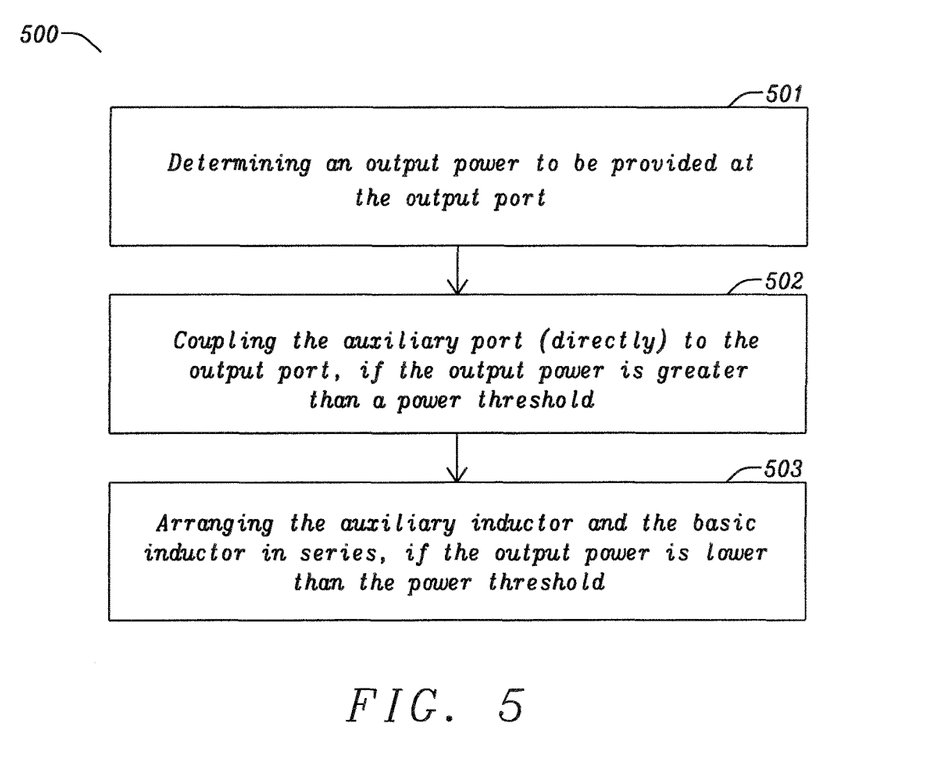
FIG. 5 shows a flow chart of an example method for providing a load current to an output of a power converter.

FIG. 5 shows a flow chart of an example method 500 for converting power between an input port and an output port of a power converter 100. The power converter 100 comprises a basic switched converter 110 (also referred to herein as a basic phase), which comprises a basic inductor 111. The basic switched converter 110 is configured to convert power between the input port and the output port. Furthermore, the power converter comprises an auxiliary switched converter 120 (also referred to as an auxiliary phase), which comprises an auxiliary inductor 121. The auxiliary switched converter 120 is configured to convert power between the input port and an auxiliary port.

The method 500 comprises determining 501 an output power to be provided at the output port. Furthermore, the method 500 comprises coupling 502 the auxiliary port (directly) to the output port, if the output power 600 is greater than a power threshold 601 (see FIG. 6). In addition, the method 500 comprises arranging 503 the auxiliary inductor 121 and the basic inductor 111 in series, if the output power is lower than the power threshold 601.

Figure 6:
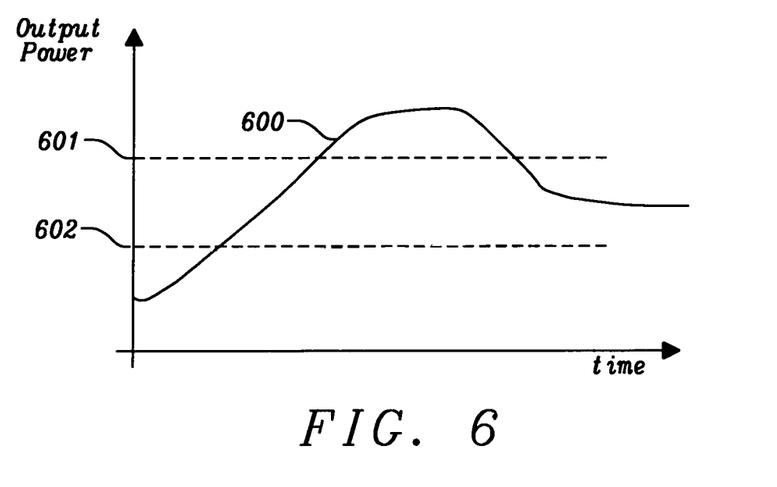
FIG. 6 shows example power thresholds.

Furthermore, a mid power threshold 602 may be considered to adapt the power consumption in a smooth manner to the requested output power, wherein the mid power threshold 602 is smaller than the power threshold 601. The auxiliary port may be coupled to the output port, if the output power 600 is greater than the power threshold 601 and the auxiliary port may be decoupled (completely) from the output port (and from the basic inductor), if the output power 600 is smaller than the power threshold 601 and greater than the mid power threshold 602. Furthermore, the auxiliary port may be coupled to the basic inductor such that the auxiliary inductor and the basic inductor are arranged in series, if the output power 600 is lower than the mid power threshold 602.

Multi-phase converters may disable one or more phases during the provision of low output current. Such phase shedding increases output voltage ripple or prohibits a reduction of the switching frequency. The converters 100 described herein re-uses inductors of shed phases to increase the inductance during the provision of low output current, thereby reducing inductor current ripple and output voltage ripple for a given output capacitance 102. Alternatively or in addition, the switching frequency may be decreased, thereby reducing switching losses. The increased inductance for the provision of low output current is achieved by re-using inductors, without the need for providing dedicated high inductance coils, thereby providing space efficient converters 100.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A multi-phase power converter, which is configured to convert power between an input port and an output port, wherein the multi-phase power converter comprises,
    at least one basic switched converter comprising a basic inductor, wherein the basic switched converter is configured to convert power between the input port and the output port;
    at least one auxiliary switched converter comprising an auxiliary inductor, wherein the auxiliary switched converter is configured to convert power between the input port and an auxiliary port;
    a set of configuration switches (S5, S6) configured to alternatingly
        couple the auxiliary port directly to the output port, such that the basic switched converter and the auxiliary switched converter are arranged in parallel between the input port and the output port, and
        couple the auxiliary inductor directly in series with the basic inductor to provide a joint switched converter comprising the serial arrangement of the auxiliary inductor and the basic inductor.

2. The multi-phase power converter of claim 1, further comprising a controller which is configured to
    determine whether the output power which is to be provided at the output port is above or below a power threshold;
    control the set of configuration switches (S5, S6) to couple the auxiliary port directly to the output port, if it is determined that the output power is above the power threshold, such that the basic switched converter and the auxiliary switched converter are arranged in parallel between the input port and the output port; and
    control the set of configuration switches (S5, S6) to couple the auxiliary inductor directly in series with the basic inductor, if it is determined that the output power is below the power threshold, to provide the joint switched converter comprising the serial arrangement of the auxiliary inductor and the basic inductor.

3. The multi-phase power converter of claim 2, wherein the controller is configured to
    determine whether the output power is above or below a mid power threshold which is smaller than the power threshold;
    control the set of configuration switches (S5, S6) to decouple the auxiliary port from the output port and to decouple the auxiliary inductor from the basic inductor, if it is determined that the output power is below the power threshold and above the mid power threshold; and
    control the set of configuration switches (S5, S6) to couple the auxiliary inductor in series with the basic inductor, if it is determined that the output power is below the mid power threshold.

4. The multi-phase power converter of claim 2, wherein the controller is configured to
    operate the basic switched converter and the auxiliary switched converter in parallel between the input port and the output port, if it is determined that the output power is above the power threshold; and
    operate the joint switched converter, if it is determined that the output power is below the power threshold.

5. The multi-phase power converter of claim 2, wherein the basic switched converter comprises a basic switching cell (S1, S2);
    the auxiliary switched converter comprises an auxiliary switching cell (S3, S4); and
    the controller is configured to deactivate one of the basic switching cell (S1, S2) and the auxiliary switching cell (S3, S4) and operate the other one of the basic switching cell (S1, S2) and the auxiliary switching cell (S3, S4), if the auxiliary inductor is arranged in series with the basic inductor.

6. The multi-phase power converter of claim 5, wherein a switching cell of a switched converter comprises a high side switch and a low side switch which are arranged in series; and
    an inductor of a switched converter is coupled to a midpoint between the high side switch and the low side switch.

7. The multi-phase power converter of claim 5, wherein the basic switching cell (S1, S2) and the auxiliary switching cell (S3, S4) are arranged in parallel to a high side and a low side of the input port; or
    the basic switching cell (S1, S2) and the auxiliary switching cell (S3, S4) are arranged in parallel to a high side and a low side of the output port; or
    the basic switching cell (S1, S2) and the auxiliary switching cell (S3, S4) are arranged between a high side of the input port and a high side of the output port; or
    the basic switching cell (S1, S2) and the auxiliary switching cell (S3, S4) are arranged in parallel to a high side and a low side of the input port, and wherein a second basic switching cell and a second auxiliary switching cell are arranged in parallel to a high side and a low side of the output port.

8. The multi-phase power converter of claim 2, wherein the controller is configured to control the basic switched converter and/or the auxiliary switched converter such that an output voltage at the output port is regulated to a target voltage and/or such that an output current at the output port is regulated to a target current.

9. The multi-phase power converter of claim 1, wherein the multi-phase power converter further comprises a second basic switched converter with a second basic inductor; wherein the second basic switched converter is configured to convert power between the input port and a second output port; and the set of configuration switches (S7, S8, S9, S10) is configured to
- couple the auxiliary port to the output port or to the second output port; or
- couple the auxiliary inductor in series with the basic inductor or in series with the second basic inductor, to provide a joint switched converter comprising the serial arrangement of the auxiliary inductor and the basic inductor or comprising the serial arrangement of the auxiliary inductor and the second basic inductor.

10. The multi-phase power converter of claim 1, wherein the basic switched converter and the auxiliary switched converter each comprise one or more of: a buck converter, a boost converter, an inverter and/or a buck-boost converter.

11. The multi-phase power converter of claim 1, wherein the basic switched converter and the auxiliary switched converter are operated in an interleaved manner, if the auxiliary port is coupled to the output port.

12. The multi-phase power converter of claim 1, wherein the set of configuration switches (S5, S6) comprises
- a first configuration switch (S5) for coupling the auxiliary port to the output port, and
- a second configuration switch (S6) for coupling the auxiliary port to the basic inductor.

13. A method for converting power between an input port and an output port of a power converter using a multi-phase power converter, wherein the multi-phase power converter comprises,
- at least one basic switched converter comprising a basic inductor, wherein the basic switched converter is configured to convert power between the input port and the output port;
- at least one auxiliary switched converter comprising an auxiliary inductor, wherein the auxiliary switched converter is configured to convert power between the input port and an auxiliary port;
- a set of configuration switches configured to alternatingly couple the auxiliary port directly to the output port, such that the basic switched converter and the auxiliary switched converter are arranged in parallel between the input port and the output port, and couple the auxiliary inductor directly in series with the basic inductor to provide a joint switched converter comprising the serial arrangement of the auxiliary inductor and the basic inductor; and wherein the method comprises
- determining an output power to be provided at the output port;
- coupling the auxiliary port directly to the output port using the set of configuration switches, if the output power is greater than a power threshold, such that the basic switched converter and the auxiliary switched converter are arranged in parallel between the input port and the output port; and
- coupling the auxiliary inductor directly in series with the basic inductor using the set of configuration switches, if the output power is lower than the power threshold, to provide a joint switched converter comprising the serial arrangement of the auxiliary inductor and the basic inductor.

14. The method of claim 13 further comprising the steps of:
- determining whether the output power which is to be provided at the output port is above or below a power threshold;
- controlling a set of configuration switches (S5, S6) to couple the auxiliary port directly to the output port, if it is determined that the output power is above the power threshold, such that the basic switched converter and the auxiliary switched converter are arranged in parallel between the input port and the output port; and
- controlling a set of configuration switches (S5, S6) to couple the auxiliary inductor directly in series with the basic inductor, if it is determined that the output power is below the power threshold, to provide the joint switched converter comprising the serial arrangement of the auxiliary inductor and the basic inductor.

15. The method of claim 14, further comprising the steps of:
- determining whether the output power is above or below a mid power threshold which is smaller than the power threshold;
- controlling the set of configuration switches (S5, S6) to decouple the auxiliary port from the output port and to decouple the auxiliary inductor from the basic inductor, if it is determined that the output power is below the power threshold and above the mid power threshold; and
- controlling the set of configuration switches (S5, S6) to couple the auxiliary inductor in series with the basic inductor, if it is determined that the output power is below the mid power threshold.

16. The method of claim 14, further comprising the steps of:
- operating the basic switched converter and the auxiliary switched converter in parallel between the input port and the output port, if it is determined that the output power is above the power threshold; and
- operating the joint switched converter, if it is determined that the output power is below the power threshold.

17. The method of claim 14, wherein
- the basic switched converter comprises a basic switching cell (S1, S2);
- the auxiliary switched converter comprises an auxiliary switching cell (S3, S4); and
- the controller deactivates one of the basic switching cell (S1, S2) and the auxiliary switching cell (S3, S4) and operate the other one of the basic switching cell (S1, S2) and the auxiliary switching cell (S3, S4), if the auxiliary inductor is arranged in series with the basic inductor.

18. The method of claim 17, wherein
- a switching cell of a switched converter comprises a high side switch and a low side switch which are arranged in series; and
- an inductor of a switched converter is coupled to a midpoint between the high side switch and the low side switch.

19. The method of claim 17, wherein
- the basic switching cell (S1, S2) and the auxiliary switching cell (S3, S4) are arranged in parallel to a high side and a low side of the input port; or
- the basic switching cell (S1, S2) and the auxiliary switching cell (S3, S4) are arranged in parallel to a high side and a low side of the output port; or the basic switching cell (S1, S2) and the auxiliary switching cell (S3, S4) are arranged between a high side of the input port and a high side of the output port; or the basic switching cell (S1, S2) and the auxiliary switching cell (S3, S4) are arranged in parallel to a high side and a low side of the input port, and wherein a second basic switching cell and a second auxiliary switching cell are arranged in parallel to a high side and a low side of the output port.

20. The method of claim 14, wherein the controller controls the basic switched converter and/or the auxiliary switched converter such that an output voltage at the output port is regulated to a target voltage and/or such that an output current at the output port is regulated to a target current.

21. The method of claim 13, wherein
the multi-phase power converter further comprises a second basic switched converter with a second basic inductor; wherein the second basic switched converter converts power between the input port and a second output port; and
the set of configuration switches (S7, S8, S9, S10)
couples the auxiliary port to the output port or to the second output port; or
couples the auxiliary inductor in series with the basic inductor or in series with the second basic inductor, to provide a joint switched converter comprising the serial arrangement of the auxiliary inductor and the basic inductor or comprising the serial arrangement of the auxiliary inductor and the second basic inductor.

22. The method of claim 13, wherein the basic switched converter and the auxiliary switched converter each comprise one or more of: a buck converter, a boost converter, an inverter and/or a buck-boost converter.

23. The method of claim 13, wherein the basic switched converter and the auxiliary switched converter are operated in an interleaved manner, if the auxiliary port is coupled to the output port.

24. The method of claim 13, wherein the set of configuration switches (S5, S6) comprises
a first configuration switch (S5) for coupling the auxiliary port to the output port, and
a second configuration switch (S6) for coupling the auxiliary port to the basic inductor.

25. The multi-phase power converter of claim 1, wherein
the multi-phase power converter further comprises a second auxiliary switched converter with a second auxiliary inductor; wherein the second auxiliary switched converter is configured to convert power between the input port and a second auxiliary port; and
the set of configuration switches (S12, S13, S14) is configured to
couple the second auxiliary port to the output port; or
couple the second auxiliary inductor in series with the basic inductor to provide a joint switched converter comprising the serial arrangement of the second auxiliary inductor and the basic inductor.

26. The multi-phase power converter of claim 25, wherein the set of configuration switches (S12, S13, S14) is configured to arrange the second auxiliary inductor in series with the auxiliary inductor.

27. The method of claim 13, wherein
the multi-phase power converter further comprises a second auxiliary switched converter with a second auxiliary inductor; wherein the second auxiliary switched converter converts power between the input port and a second auxiliary port; and
the set of configuration switches (S12, S13, S14)
couples the second auxiliary port to the output port; or
couples the second auxiliary inductor in series with the basic inductor to provide a joint switched converter comprising the serial arrangement of the second auxiliary inductor and the basic inductor.

* * * * *